(12) United States Patent
Do et al.

(10) Patent No.: US 9,171,142 B2
(45) Date of Patent: *Oct. 27, 2015

(54) ARRANGEMENTS FOR IDENTIFYING USERS IN A MULTI-TOUCH SURFACE ENVIRONMENT

(71) Applicant: International Business Machines Corporation, Armonk, NY (US)

(72) Inventors: Lydia M. Do, Raleigh, NC (US); Pamela A. Nesbitt, Ridgefield, CT (US); Lisa Seacat DeLuca, Baltimore, MD (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/224,158

(22) Filed: Mar. 25, 2014

(65) Prior Publication Data

US 2014/0259151 A1    Sep. 11, 2014

Related U.S. Application Data

(63) Continuation of application No. 11/924,461, filed on Oct. 25, 2007, now Pat. No. 8,719,920.

(51) Int. Cl.
| | |
|---|---|
| *G06F 21/35* | (2013.01) |
| *H04L 9/32* | (2006.01) |
| *G06F 3/041* | (2006.01) |
| *G06F 21/31* | (2013.01) |
| *G06F 21/32* | (2013.01) |
| *G06F 3/0488* | (2013.01) |

(52) U.S. Cl.
CPC ............. *G06F 21/35* (2013.01); *G06F 3/0416* (2013.01); *G06F 21/31* (2013.01); *G06F 21/32* (2013.01); *G06F 3/0488* (2013.01)

(58) Field of Classification Search
CPC ......... G06F 21/35; G06F 21/34; G06F 21/31; G06F 21/30; G06F 2221/2153; G06F 3/0488; G06F 3/0416; H04L 9/3234
See application file for complete search history.

(56) References Cited

U.S. PATENT DOCUMENTS

| | | |
|---|---|---|
| 3,694,578 A | 9/1972 | Reid |
| 5,854,450 A | 12/1998 | Kent |
| 6,256,737 B1 | 7/2001 | Bianco et al. |
| 6,608,636 B1 | 8/2003 | Roseman |
| 6,659,866 B2 | 12/2003 | Frost et al. |
| 6,697,947 B1 | 2/2004 | Matyas, Jr. et al. |
| 7,086,085 B1 | 8/2006 | Brown et al. |
| 7,204,428 B2 | 4/2007 | Wilson |

(Continued)

OTHER PUBLICATIONS

Ping Yan; A Fast Algorthm for ICP-Based 3D Shaped Biometrics; Nov. 2006; Science Direct; pp. 1-8.

*Primary Examiner* — Zachary A Davis
(74) *Attorney, Agent, or Firm* — L. Jeffrey Kelly; Catherine Ivers (57) ABSTRACT

Arrangements to identify, in some form, multiple participants by an interactive surface system utilizing multi-touch technology are disclosed. The interactive surface system could identify, authorize, and allocate space on a surface for a participant based on identifying at least one attribute of the participant such as an object associated with the participant. The method can include searching for a first distinctive attribute of the participant, assigning an identifier to the attribute, and storing the identifier for future use. Other embodiments are also disclosed.

8 Claims, 3 Drawing Sheets

(56) References Cited

U.S. PATENT DOCUMENTS

| | | |
|---|---|---|
| 7,656,394 B2 | 2/2010 | Westerman et al. |
| 7,874,923 B2 * | 1/2011 | Mattice et al. ............... 463/46 |
| 7,941,669 B2 | 5/2011 | Foley et al. |
| 7,966,489 B2 | 6/2011 | Cam-Winget et al. |
| 8,125,459 B2 | 2/2012 | Mattice et al. |
| 8,147,316 B2 | 4/2012 | Arezina et al. |
| 8,157,652 B2 | 4/2012 | Nguyen et al. |
| 8,181,122 B2 | 5/2012 | Davidson |
| 8,348,747 B2 | 1/2013 | Arezina et al. |
| 8,719,920 B2 * | 5/2014 | Do et al. ..................... 726/19 |
| 2006/0068866 A1 | 3/2006 | White et al. |
| 2006/0224645 A1 | 10/2006 | Kadi |
| 2007/0046775 A1 | 3/2007 | Ferren et al. |
| 2007/0112828 A1 * | 5/2007 | Tischer ..................... 707/102 |
| 2009/0085877 A1 | 4/2009 | Chang et al. |
| 2009/0143141 A1 | 6/2009 | Wells et al. |

* cited by examiner

ARRANGEMENTS FOR IDENTIFYING USERS IN A MULTI-TOUCH SURFACE ENVIRONMENT

CROSS-REFERENCE TO RELATED APPLICATION

This application is a continuation of and claims priority from U.S. application Ser. No. 11/924,461 filed Oct. 25, 2007, the entire contents of which is incorporated herein by reference.

BACKGROUND

The present disclosure relates generally to interactive surface systems and more particularly to assigning identities to participants and to authenticating participants proximate to a multi-touch interactive surface system.

User friendliness of computers continues to be enhanced by better user interfaces. User interfaces for computer systems have evolved significantly since the personal computer (PC) first became widely available. Early PCs used rather primitive user input devices, where a single keyboard was the only human input mechanism. The vast improvement in microprocessors, available memory, and programming functionality have all contributed to the advancement of user interface designs and the development of user friendly graphic based operating systems and hardware.

One particular area of advancement in user interface technology pertains to surface computing technology. Surface computing allows any number of users to interact with a computer through an interactive surface. The computer can render a graphical user interface ("GUI") on the surface and multiple users may manipulate GUI displayed "objects" directly with their hands using multi-touch technology as opposed to using traditional input devices such as a mouse or a keyboard. In such a manner, the devices through which users provide input and receive output are merged into a single surface, which provides an intuitive and efficient mechanism for users to interact with the computer.

As surface computing becomes more ubiquitous in everyday environments, readers will appreciate advancements in how users may utilize surface computing to intuitively and efficiently perform tasks that may be cumbersome using traditional input devices such as a keyboard and mouse. More specifically in this case, the advancement pertains to the detection of something near an interactive surface, which is sometimes referred to as proximity detection. Generally, as applied to user interfaces, proximity detection is thus concerned with the detection of multiple objects and/or gestures, including inanimate objects, and persons, through the use of a user's hand or finger, for example, when in proximity of a user interface or surface. Such a system is commonly referred to as a multi-touch interactive system. Such a system can include a touch screen, touch tablet or touchpad that recognizes multiple simultaneous touch points and typically has software to interpret such simultaneous touches.

There are several detection technologies that may be utilized for proximity detection in connection with a user interface, including capacitance-based systems, infrared, and various optical-based detection systems. Optical-based proximity detection techniques have been developed that provide for illuminating an entire user interface surface with light and employ a digital video camera to recognize objects that are either in contact or proximate to a graphic display surface, based upon the light reflected from the objects. Interactive surfaces also allow for file sharing where the contents of a file can be projected to each user. The ways to detect objects and share files could be improved if there was better coordination between participants using the interactive surface or proximate to the interactive surface as only limited coordination capabilities exist.

SUMMARY

The problems identified above are in large part addressed by the systems, arrangements, methods and media disclosed herein to identify, in some form, participants associated with a multi-touch interactive surface system. The system can simultaneously identify attributes of entities (i.e. a participant or an object associated with a participant) that are proximate to the system. In some embodiments, the presence of the participants or the objects can be detected, and a distinctive attribute of the entity can be searched for and acquired. The attribute can be assigned an identifier and the identifier can be stored for future use. The ability to distinguish participants proximate to a multi-touch interactive surface can allow for the system to provide personalized interaction for each participant sitting around a multi-touch table such that personalized interactions become possible. It can be appreciated that an exact identity of the participant is not necessary to provide personalized interactions. The system allows an "abstract" identity, such as an attribute or piece of information that is unique to participants (e.g. audio, picture, or other meta-data) to be utilized as a temporary persona.

In other embodiments, the method can include comparing the attribute to attributes in a library of attributes and assigning the identifier when the attribute cannot be located in the library. If the attribute can be located in the library the system can positively identify the participant, possibly as an authorized participant or a return participant. Also preferences for the participant can be retrieved and utilized to customize content or a system based process. In some embodiments, searching can include commencing a first type of search for a first attribute type and commencing a second type of search for a second attribute type when the first search does not provide acceptable results such as a match. The search can search for a biometric attribute, an image based attribute, or a radio frequency based attribute to name a few. In some embodiments, a user can select what type of attribute the interactive surface will search for such that the system can request a specific type of identifier from the participant. In other embodiments a hierarchy of attribute searches can be automatically conducted by the system until an acceptable identity is achieved.

In some embodiments a system is disclosed that has an identifier module coupled to an interactive surface that can identify an attribute of an entity that is proximate to the interactive surface. The system can have memory coupled to the interactive surface to store data on attributes of entities and a compare module to compare the identified attribute to the stored attribute and identity data for authentication purposes. Further, the system can include an assignment module to assign a unique identifier to the attribute when the identifier cannot be located in the memory. The identifier module can take many forms such as a radio receiver, an audio receiver, a motion sensor/detector, or a video device coupled to a biometric type sensor.

In yet another embodiment, a machine-accessible medium is disclosed that contains instructions. When the instructions are executed by a machine, the instructions cause said machine to perform operations. The operations can include detecting a presence of an entity proximate to an interactive surface, searching for a distinctive attribute of the entity, acquiring an attribute of the entity, assigning an identifier to the attribute, and storing the identifier. In some embodiments, the instructions of the medium, when executed, cause the computer to compare the attribute to attributes in a library of attributes and assign an identifier to the attribute in response to an absence of the attribute in the library. Further the computer may locate an attribute file associated with the attribute in response to the attribute being present in the library.

BRIEF DESCRIPTION OF THE DRAWINGS

Aspects of the invention will become apparent upon reading the following detailed description and upon reference to the accompanying drawings in which like references may indicate similar elements.

DETAILED DESCRIPTION

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

Generally, systems and methods are disclosed that can detect a presence of a participant in an activity supported by an interactive surface system and can detect an attribute associable with the participant. The participant can be assigned an identity based on the attribute and a location of the participant in relationship to the interactive surface. In some embodiments, the participant can be prompted for an input and in other embodiments the system can automatically acquire an attribute and assign an identifier based on a search or screening process. The unique identity of participants can be utilized in many different ways such that personalized interaction is possible. For example, in a business meeting setting, a moderator and group of participants can be identified relative to their position and location proximate to the multi-touch interactive surface. The moderator could share information with various participants once authentication has been completed. Such an exchange of information could utilize these unique identities and their relative location to exchange and distribute the information using the multi-touch interactive surface.

For example, with authenticated users and known locations, documents can be selectively sent to participants. In other examples meeting action items can be put in front of the appropriate participant. In other embodiments the system can automatically record the meeting by identifying a speaker (someone talking). In a restaurant setting the system can identify who is eating and drinking and what they are eating and drinking so that the participant can be charged according to what they ordered. In another embodiment the system could tell a waiter which participant has made an order or who should be given the ticket.

Figure 1:
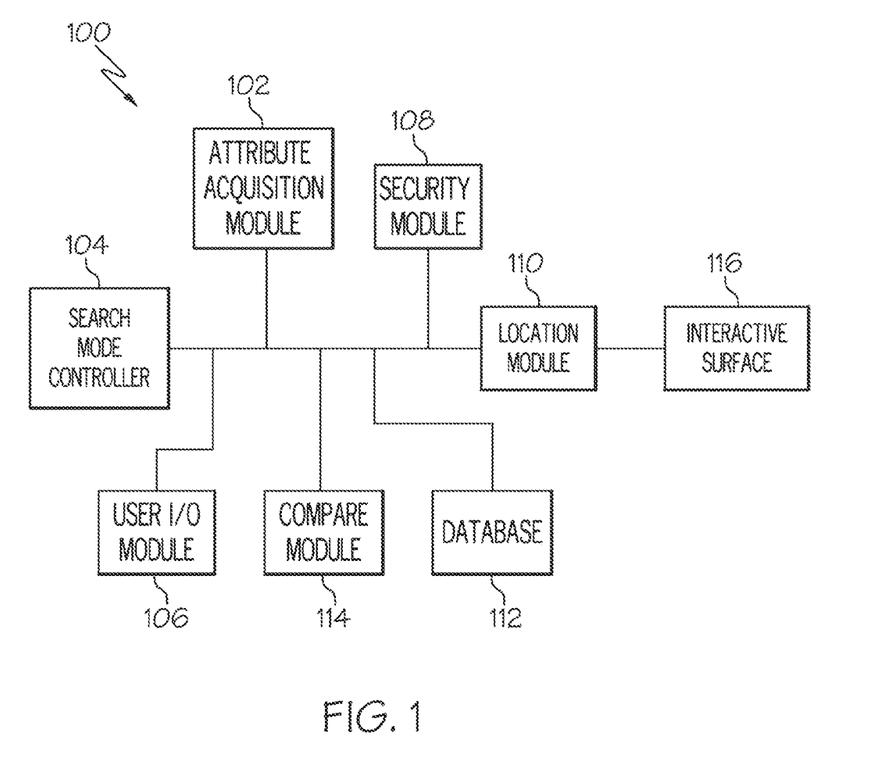
FIG. 1 is a block diagram of an interactive surface with an attribute acquisition sub-system.

Referring to FIG. 1 an entity identification system for use by a multi-touch interactive surface system 100 is illustrated. The entity to be identified can be a human (referred to herein as a participant), or a device, or anything that has an identifiable attribute. The system 100 can include an attribute acquisition module 102, a mode controller 104, a user input/output module 106, a security module 108, a location module 110, a database 112, a compare module 114 and an interactive surface 116. The system 100 can allow multiple users to be authenticated concurrently (for security purposes) with any medium whether it's with a mixed blend of detectable devices (e.g. mp3, phone, etc.) or user input. Further, the system 100 can allow for an abstraction of the user's identity by allowing the user to associate a piece of information (e.g. audio, picture, or other meta-data) as a temporary persona, such that the participant can be distinguished from other participants. The participant can be assigned a location (or a space) on the multi-touch interactive surface such that the system can interact with the participant based on authentication and the participant's location.

Two identification modes can be accommodated by the system, a unique attribute mode and an abstract attribute mode. In some embodiments, an abstract attribute only needs to be unique in that all current participants can be uniquely identified. A unique attribute mode can allow the system to acquire additional information such as contact information, where an abstract mode may serve only one purpose, to distinguish participants from each other. For example, a unique identifier can be a social security number, an employee identification number, a driver's license number, a credit card number, a media access control number of a laptop, or some biometric identity means.

An abstract identifier could be a symbol drawn by a participant on the interactive surface or even a voice identity. Abstract identification can also include signatures from transmission of an electronic device or optical data acquired from an object. For example, a cell phone or a Palm Pilot either on the individual or placed on the interactive surface in front of the individual can have a profile that can be identified with digital pixel processing methods such as edge detection. Further, abstract identification could be referred to as anonymous identification. More specifically anonymous identification could be described as not having one's identity, characteristics or significant features disclosed or not having a unique identity outside the general area where the interactive surface is operating.

During operation, a participant can approach and sit down by the interactive surface 116 and the attribute acquisition module 102, via the interactive surface 116 or the user interface 106 can query the participant or an object related to the participant for an attribute in a registration type process. For example, the attribute acquisition module 102 can send or receive a radio transmission to/from an electrical device such as a participant's mobile phone or a participant's personal digital assistant via a telecommunications protocol, a Bluetooth protocol or a wireless local area network protocol. In other embodiments, the user input output module 106 can provide audio or video to the participant asking the participant to speak or to place his or her hand on the interactive surface 116 or look into the interactive surface 116 such that a biometric identifier can be acquired by the system 100. In yet other embodiments, the user input output module 106 can ask the participant to draw something on the interactive surface 116.

In an automated attribute search mode, the mode controller 104 can control a searching sequence where the system can sequentially attempt different modes of acquisition (e.g. RF, audio, biometric, then an input request etc.) according to a predetermined hierarchy. If one mode does not provide acceptable results for acquiring an identity then another mode can be attempted according to the predetermined scanning and acquisition hierarchy. Such a hierarchy can be user configured via the user input output module 106.

When an attribute is acquired, the attribute can be compared to attributes stored in the database 112 via compare module 114. In some embodiments if the attribute has been detected previously, the system 100 may assume that the participant remains engaged in a current session or is a return participant. In other embodiments the compare module 114 can authenticate a participant as an authorized person based on the attribute and attributes stored in the database 112. Security module 108 can detect a breach in security in response to the compare module functions or based on the attribute or identifier and can control the system 100 accordingly or can notify an administrator of the breach. Location module 110 can determine locations of the participants and/or their devices and can allocate space on the surface for an identified participant. In some embodiments, only a relative location needs to be determined and in other embodiments real world location coordinates can be determined.

Figure 2:
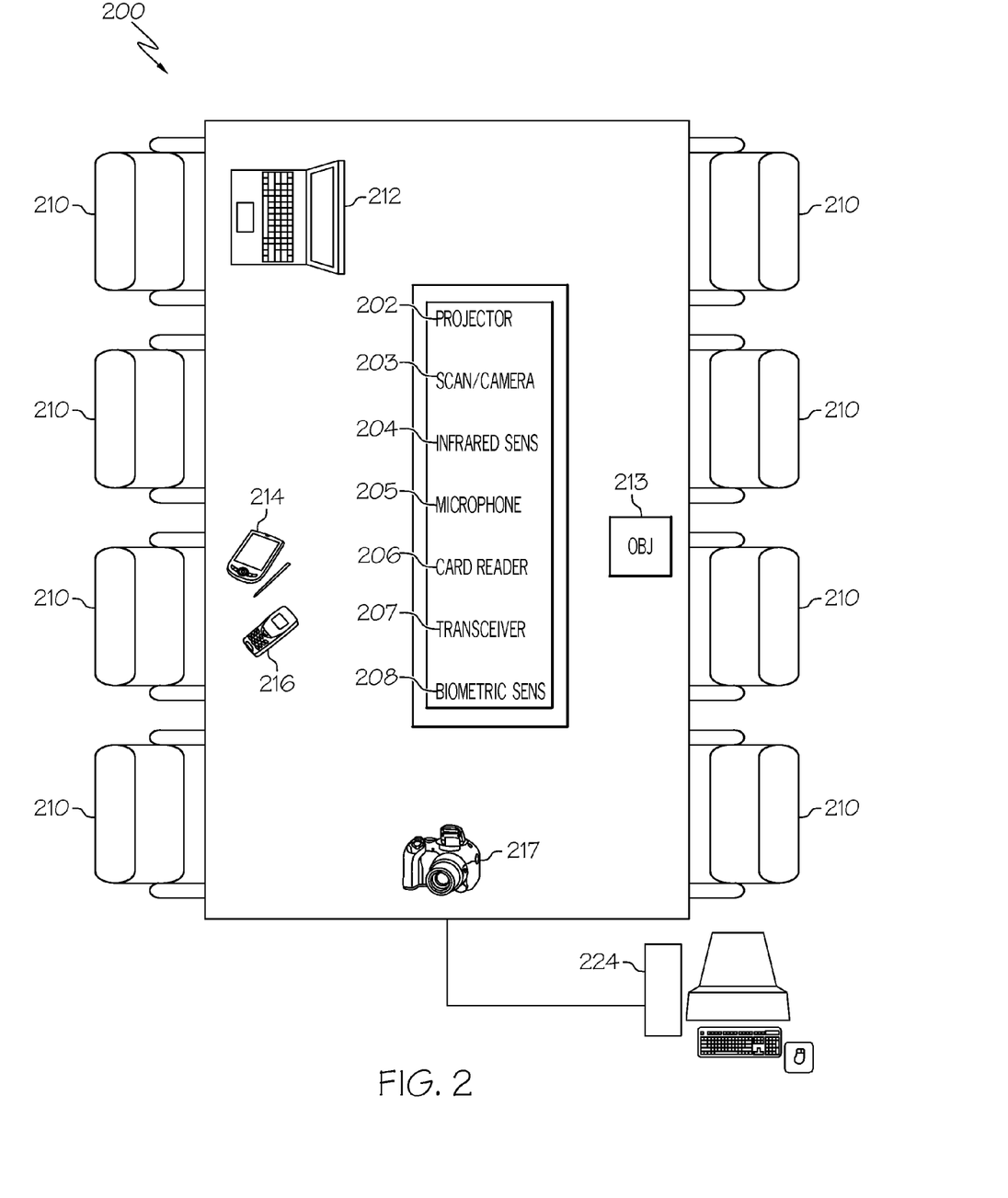
FIG. 2 is a top view of a multi-touch interactive surface table with entities such as participants.

Referring to FIG. 2, a top view of an interactive surface system 200 with entities or participants 210 sitting around the interactive surface of the multi-touch interactive surface system 200 is disclosed. The system 200 can include many attribute acquisition modules such as projector 202, a camera 203, an infrared sensor 204, a microphone 205, a card reader 206, transceiver 207 and biometric module 208 to name a few (referred to herein as attribute acquisition modules (202-208)). These attribute acquisition modules 202-208 can be connected to a surface computing module 224. Participants 210 can have attributes such as devices associated with them. Such association can be assumed based on the proximity of the device to the participant 210.

In some embodiments, the interactive surface 200 does not need to know specifics of the participant 210 and can be concerned only with an entity or thing associated with the participant 210 such as laptop computer 212, object 213, personal digital assistant 214, mobile phone 216, camera 217, or any object 213 herein referred to as attributes (212-217). Participants 210 can also be considered as entities. Thus, attribute acquisition modules 202-208 can, in some modes query entities 210 and 212-217 and electronically can take pictures or video, audio reading, fingerprints, electronic transmissions, signatures, biometric scans etc. and can acquire attributes about entities 210, and 212-217. The surface computer module 224 can then use this attribute data to facilitate operations such as sharing of information or to personalize content or processes provided to the participant.

Multi-touch interactive surface system 200 can take the form of the multi-touch "Surface table" product available from Microsoft Corporation. Such a table has the ability to display graphic images and exchange information between multiple participants 210 and between multiple participant devices. Surface table is a trademark of Microsoft Corporation. It can be appreciated that the interactive display surface need not be in the form of a generally horizontal table top. The principles described in this description suitably also can include and apply to multiple display surfaces or display surfaces having different shapes and curvatures mounted in orientations other than a horizontal orientation.

Thus, although the following description refers to placing physical objects "on" the interactive display surface, physical objects may be placed adjacent to the interactive display surface by placing the physical objects in contact with the display surface, or otherwise adjacent to the display surface. It can be appreciated that multiple participants can be identified at any given time. The system can simultaneously identify attributes of entities (i.e. a participant or a participant's object/thing) that are proximate to the system.

Figure 3:
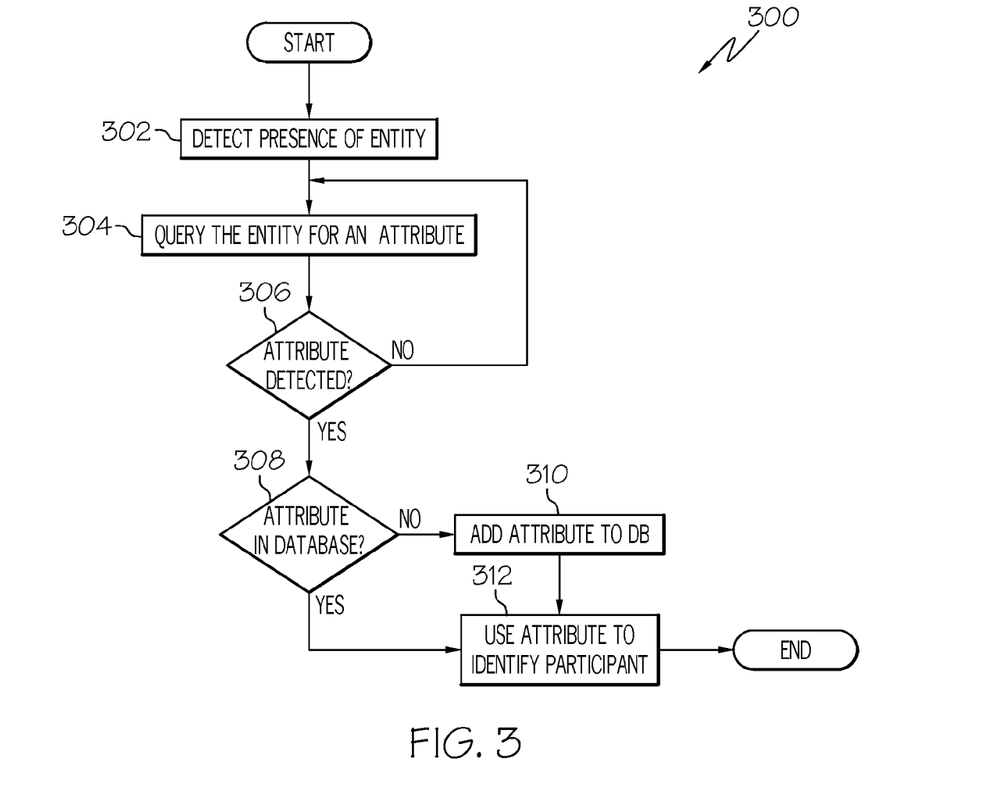
FIG. 3 is a flow diagram of a method for acquiring an attribute from entities proximate to a multi-touch interactive surface.

Referring to FIG. 3 a flow diagram 300 for identifying participants or individuals sitting around or proximate to an interactive surface is disclosed. Identifying and/or authenticating individuals and their location can allow for personalized interactions or secure interactions between participants utilizing the interactive surface to conduct a meeting. As illustrated by block 302 a presence of and location of an entity such as a participant can be detected proximate to the interactive surface. Thus, as an individual approaches the interactive surface and possibly sits down proximate to the system, a motion detector or a camera could recognize the approaching participant and start a participant registration process. In other embodiments, the participant or a device under the control of the participant could provide a presence indicator such as a transmission to activate a search by the interactive surface system to acquire an identifier of the participant or an associated object. Using the identity the system could authenticate and authorize the participant.

As illustrated by block 304, the entity (participant, device or object) could be queried for an attribute. The attribute could be a unique identifier as determined by the system. The query could be for a unique identity or an abstract identity as described above. For example identification could be achieved via Bluetooth compliant communications. In one embodiment, a radio receiver in the system can intercept Bluetooth type transmissions and utilize the identifiers in the Bluetooth compliant transmission to identify the participant that is proximate to the interactive surface.

As stated above, unique identifiers can be utilized to acquire additional information such as contact information. Such identifiers can be provided with a digital identity such as an alpha-numeric identifier where the digital identifier could be utilized to acquire more personal information such as contact information via databases accessible over a network connection. Unique identifiers can include scanned identification cards such as a business card, a credit card number, or a smart card or an employee identification badge, a driver's license or some other card that is a personal identification produced by an entity. In yet another embodiment, a user could input to the interactive surface a name or number via a virtual keypad or keyboard displayed by the interactive surface.

In some embodiments, a location-based identification can also be implemented where attribute data and location information can be related or associated and stored. Location based identification can include the exchange of radio frequency based coordinates. Location based identification can also be determined based on transmission delays and signal strength data to estimate or acquire location data. In other embodiments, triangulation techniques can be utilized to obtain location data. The radio transceivers may be wireless local area network (WLAN) transceivers, mobile telephone transceiver or a combination of both. In other embodiments, a global positioning system (GPS) device under the control of a user could be utilized to provide coordinates of an individual and these coordinates could be exchanged with the interactive surface system.

In some embodiments, the attribute could be identification media that could be optically scanned with some form of optical scanner. In addition business card readers, card proximity readers or radio frequency identification systems could be implemented. In other embodiments, a surface scanner on the interactive surface could scan the text on a piece of paper. Furthermore, using optical character recognition, an identity file can be created with respect to the participant. Also a text to speech conversion can also be utilized for these purposes. In some embodiments, initially, a user interface could query a user for a type or specific classification of participant attribute. For example, a user could be queried via text or audibly by the interactive surface system to provide, or input some form of attribute or identifier into the system.

In another embodiment, the user could be asked to provide an action or motion such as to draw something on the interactive surface with his or her finger or input some graphic or artistic representation on the interactive surface that would represent the participant. In response, a participant or future participant could draw a box with an X inside of the box and this could be an identifier/attribute that the participant has chosen to be associated with. Accordingly an anonymous persona or abstract identifier could be utilized where the indicator could be "unlinked" or "unlinkable" to any actual or real identity. In other embodiments a unique attribute such as a finger print, a hand print or any other biometric type attribute could also be requested by and accepted by the interactive surface system. In yet other embodiments, the interactive surface system could ask for the user to speak or recite a sentence and some form of audio/voice recognition system could be utilized to create an identity for a user.

In another example, a particular series or unique series of taps of a hand, foot or pen or a motion of the hand, arm, or leg could be utilized to identify an individual in proximity to the interactive surface. In such an embodiment a gesture sensor could detect such a movement by a participant. A gesture sensor could be one or a combination of sensors such as a touch sensor, a motion sensor, an audio sensor, a heat or infrared sensor, a video device, and a biometric sensor. Accordingly, an audible sequence of user inputs can be composed of any motion or contact of objects that can produce a unique sound. In some embodiments every person involved could have their own, assigned sequence. For example one person may be assigned placing their palm flat on the surface then a TAP, TAP, TAAAAAAAAAAAAAAAAP, TAP.

In other embodiments a detectable electronic device such as a phone or a digital audio player could be utilized to provide an identity for a participant. Generally, each person/participant who approaches the multi-touch interactive surface or sits down at the surface can place a uniquely identifiable personal item on the surface to gain authorization and be allocated space on the multi-touch surface and such that the system can uniquely service the participant. The personal items can have different classes of attributes and identifiers and thus, the system can allow for mixed usage of attribute types/classification to be placed on the table/acquired by the system.

As illustrated by decision block 306, it can be determined if an acceptable attribute has been acquired by the system. As illustrated in block 308, it can be determined if the attribute detected can be located in a database such that an identifier can be qualified or verified or that a repeat participant can be confirmed, or additional information on the participant can be retrieved possibly to customize content provided by the interactive surface. Typically, a unique identity can be utilized to query data bases and to locate additional information on the participant. If the attribute cannot be located in the database the attribute and other information such as the type or class of attribute can be added to the database, as illustrated by block 310. Thus, in some embodiments, a file can be created in the database for an individual with the individual's unique identity or an abstract file can be generated if the attribute is not already stored in the database. Furthermore, as shown in block 312, in some embodiments, if the attribute is stored in the database, the attribute can be used to identify a participant.

In some embodiments, transmissions from a mobile phone, for example a cellular telephone owned by a participant, could be utilized to identify a user. A mobile phone will periodically emit a communication signal and a receiver connected to the interactive surface table could detect these emissions and associate the emissions with a participant. Likewise, emissions from a Bluetooth compatible device could be utilized as an attribute and as an identifier. In other embodiments, attribute acquisition modules could extract the desktop background off each participant's cell phone and use such data as an identifier. In yet another embodiment, picture data from a participant's camera could be utilized as an identifier. For example, a camera with wireless download capability could be queried by a transceiver of the system and the transceiver could extract the last photo taken or any photo stored by the digital camera and the interactive surface system could associate this photo with an identity of a participant. In some embodiments, a song that is being played or that has been recorded by a participant's device such as a digital audio recorder can be associated with the participant.

In other embodiments, a participant can present some form of authorization or identification such as a user name or a password. The interactive surface system can have a direct interface with the participant based on a location on the interactive surface that is proximate to the participant. As stated above, a biometric scan could also be utilized and such personal identification information can be sent from the interactive surface system to some "accurate" detection device such as a computing device that specializes in biometric data matching. This embodiment can provide an extra level of security for high level meetings where the system could use the attributes or identifiers and proceed through additional layers of interaction with the interactive surface to authenticate the participant. This feature would be a possibility to avoid cases where electronic devices are stolen or someone picks up another user's device seated at the table.

Accordingly, this security feature can allow multiple users to concurrently authenticate with any medium whether it's with a mixed blend of detectable devices such as audio producing devices, mobile phones, or user input. Such a security feature allows a level of abstraction of the user's identity by allowing the user to associate a piece of information (e.g. audio, picture, or other meta-data) as a temporary persona. In some embodiments an avatar such as those found in virtual universes could be created or provided by a participant and utilized by the system. Once a participant is identified, the interactive surface could indicate on the surface other participants that have been identified and the existence of one or all participants.

An implementation of the process described above, may be stored on, or transmitted across some form of computer readable media. Computer readable media can be any available media that can be accessed by a computer. By way of example, and not limitation, computer readable media may comprise "computer storage media" and "communications media." "Computer storage media" include volatile and nonvolatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer. "Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

While specific embodiments will be described below with reference to particular configurations of hardware and/or software, those of skill in the art will realize that embodiments may advantageously be implemented with other equivalent hardware and/or software systems. Aspects of the disclosure described herein may be stored or distributed on computer readable media, including magnetic and optically readable and removable computer disks, as well as distributed electronically over the Internet or over other networks, including wireless networks. Data structures and transmission of data (including wireless transmission) particular to aspects of the disclosure are also encompassed within the scope of the disclosure.

Each process disclosed herein can be implemented with a software program. The software programs described herein may be operated on any type of computer, such as personal computer, server, etc. Any programs may be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet, intranet or other networks. Such signal-bearing media, when carrying computer readable instructions that direct the functions of the disclosed arrangements, represent embodiments of the present disclosure.

The disclosed embodiments can take the form of an entirely hardware embodiment, an entirely software embodiment or an embodiment containing both hardware and software elements. In a preferred embodiment, the invention is implemented in software, which includes but is not limited to firmware, resident software, microcode, etc. Furthermore, the invention can take the form of a computer program product accessible from a computer-usable or computer readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD. A data processing system suitable for storing and/or executing program code can include at least one processor, logic, or a state machine coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

It is understood that the form of the invention shown and described in the detailed description and the drawings are to be taken merely as examples. It is intended that the following claims be interpreted broadly to embrace all the variations of the example embodiments disclosed.

What is claimed is:

1. A method comprising the steps of:
   detecting a presence of an entity proximate to a multi-touch interactive surface, wherein the entity is a participant in a multi-participant activity supported by the multi-touch interactive surface;
   scanning for an attribute of the entity, wherein the attribute is a cell phone desktop background residing on a mobile device of the entity;
   acquiring the attribute of the entity;
   assigning an identifier to the attribute based on the attribute; and
   storing the identifier for authenticating the entity.

2. The method of claim 1, wherein the identifier is based on the attribute and a location of the entity relative to the multi-touch interactive surface.

3. The method according to claim 2, further comprising: authenticating the entity based on the identifier.

4. A system comprising:
   a multi-touch interactive surface;
   an identifier module coupled to the multi-touch interactive surface to identify an attribute of an entity that is proximate to the interactive surface via an electromagnetic signal from the entity, wherein the entity is a participant in a multi-participant activity supported by the multi-touch interactive surface;
   memory coupled to the multi-touch interactive surface to store data on the attribute of the entity;
   a compare module coupled to the identifier module to compare the identified attribute to the stored data on attributes and to determine a presence of the identified attribute in the memory; and
   an assignment module to assign an identifier to the identified attribute when the identifier is absent from the memory, wherein the identifier is based on the identified attribute, and wherein the identified attribute is a cell phone desktop background residing on a mobile device of the entity.

5. The system of claim 4, wherein the identifier is based on the attribute and a location of the entity relative to the multi-touch interactive surface.

6. A non-transitory article of manufacture tangibly embodying computer-readable instructions which, when implemented cause a computer to carry out the steps of a method, comprising:
- detecting a presence of an entity proximate to a multi-touch interactive surface, wherein the entity is a participant in a multi-participant activity supported by the multi-touch interactive surface;
- scanning for an attribute of the entity, wherein the attribute is a cell phone desktop background residing on a mobile device of the entity;
- acquiring the attribute of the entity;
- assigning an identifier to the attribute based on the attribute; and
- storing the identifier for authenticating the entity.

7. The article of manufacture of claim 6, wherein the identifier is based on the attribute and a location of the entity relative to the multi-touch interactive surface.

8. The article of manufacture of claim 7, the method further comprising:
- authenticating the entity based on the identifier.

* * * * *